(12) United States Patent
Martinez et al.

(10) Patent No.: US 7,296,244 B2
(45) Date of Patent: Nov. 13, 2007

(54) METHOD OF VISUALLY INDICATING TRANSFER OF DATA IN RESPONSE TO A TRANSFER DATA COMMAND

(75) Inventors: Anthony E. Martinez, Spicewood, TX (US); Michael D. Rahn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1325 days.

(21) Appl. No.: 09/981,905

(22) Filed: Oct. 18, 2001

(65) Prior Publication Data

US 2003/0076359 A1    Apr. 24, 2003

(51) Int. Cl.
*G06F 3/00* (2006.01)
(52) U.S. Cl. .................. 715/861; 715/859; 715/769
(58) Field of Classification Search ............. 345/769, 345/770, 856, 859, 861
See application file for complete search history.

(56) References Cited

U.S. PATENT DOCUMENTS

| 5,404,442 | A |  | 4/1995 | Foster et al. |
| 5,579,521 | A |  | 11/1996 | Shearer et al. |
| 5,666,552 | A | * | 9/1997 | Greyson et al. ............ 715/539 |
| 5,694,151 | A |  | 12/1997 | Johnston, Jr. et al. |
| 5,801,693 | A |  | 9/1998 | Bailey |
| 5,900,005 | A |  | 5/1999 | Saito |
| 6,177,939 | B1 |  | 1/2001 | Blish et al. |
| 6,396,474 | B1 | * | 5/2002 | Johnson et al. ............. 345/856 |

\* cited by examiner

*Primary Examiner*—John Cabeca
*Assistant Examiner*—Dennis Bonshock
(74) *Attorney, Agent, or Firm*—Cardinal Law Group

(57) ABSTRACT

A method of visually indicating transfer of data in response to a pointing device data transfer command is provided. A display position indicator on a display screen is modified based on a data transfer command. Data transfer is animated on the display screen based on the data transfer command from a pointing device.

1 Claim, 4 Drawing Sheets

Animation sequence for a copy command

| Scene one | 20  16<br>The quick brown fox jumped over |
|---|---|
| Scene two | 22        18<br>                brown fox<br>The quick brown fox jumped over |
| Scene three | 24<br>                    brown fox<br>The quick brown fox jumped over |
| Scene four | 26<br>                         brown fox<br>The quick brown fox jumped over |
| Scene five | 28<br>The quick brown fox jumped over |
| Scene six | 30<br>The quick brown fox jumped over |
| Scene seven | 32<br>The quick brown fox jumped over |
| Scene eight | 34<br>The quick brown fox jumped over |
| Scene nine | 36<br>The quick brown fox jumped over |

FIG.2

Animation sequence for a paste command

| Scene one | 40  38<br>The quick jumped over | |
|---|---|---|
| Scene two | 42<br>The quick jumped over | |
| Scene three | 44<br>The quick jumped over | |
| Scene four | 46<br>The quick jumped over | |
| Scene five | 48<br>The quick jumped over | |
| Scene six | 50                    58<br>                       [brown fox]<br>The quick jumped over | |
| Scene seven | 52<br>                 [brown fox]<br>The quick jumped over | |
| Scene eight | 54<br>           [brown fox]<br>The quick jumped over | |
| Scene nine | 56<br>The quick brown fox jumped over | |

METHOD OF VISUALLY INDICATING TRANSFER OF DATA IN RESPONSE TO A TRANSFER DATA COMMAND

TECHNICAL FIELD OF THE INVENTION

In general, the invention relates to a visually indicating transfer of data in response to a transfer data command.

BACKGROUND OF THE INVENTION

The use of a computer pointing device such as a mouse, trackball, or stylus pen are very common in computing today. One common use of a pointing device is to mark an object displayed on a computer screen for insertion into a clipboard. A clipboard is typically a temporary storage location in the computer that provides the user with a method of transferring data. Common commands associated with clipboards include cut, copy, and paste. The cut command instructs the computer to remove a marked object and place it in the clipboard. A copy command instructs the computer to place a copy of the object into the clipboard leaving the original object on the display. A paste command instructs the computer to place an object stored in the clipboard onto the display at a location indicated by the user. While there are other commands associated with clipboards, most are a variation of the cut, copy and paste commands.

In general, an operator will use a pointing device to move a display position indicator to an object shown on the display. By pressing control buttons on the pointing device and maneuvering the display position indicator, an object on the display may be marked. Once an object has been marked, it may be transferred into a clipboard using a cut or copy command. One method of executing a cut or copy command is to select a display icon representing the desired command. In some applications, the cut and copy icons may not be displayed until an edit window is displayed. Another method of executing a cut or copy command is by typing the desired command on a keyboard. Once the object has been placed in the clipboard, the user may indicate a location to insert the object. The user may then execute a paste command by selecting a display icon representing the paste command or by typing the command on a keyboard.

One drawback with this method of transferring data to and from a clipboard is that there is no visual feed back to the operator that data has been transferred. Also, there is no indication that there is data contained in the clipboard.

What is therefore needed is a method, which overcomes the above disadvantages.

SUMMARY OF THE INVENTION

One aspect of the invention provides a method of visually indicating transfer of data in response to a pointing device data transfer command. A display position indicator on a display screen may be modified based on a data transfer command. Data transfer may be animated on the display screen based on the data transfer command from a pointing device. The data transfer command may be selected from a group consisting of cut, paste and copy. Modifying the display position indicator in response to one of a cut or copy command may include changing the position indicator to a position indicator with a reduced object in an indicator bubble. Animating the data transfer in response to one of a cut or copy command may include reducing a marked object to a reduced object and moving the reduced object through the position indicator into an indicator bubble. Animating the data transfer in response to one of a cut or copy command may include moving the marked object towards the position indicator while the object is being reduced. Modifying the position indicator in response to a paste command may include changing the position indicator to a position indicator without a reduced object in an indicator bubble. Animating data transfer in response to a paste command may include moving a reduced object from an indicator bubble in the position indicator through the position indicator, expanding the reduced object, and inserting the expanded object into a location indicated by an insertion marker. Animating data transfer in response to a paste command may include moving the expanding reduced object towards an insertion marker while the reduced object is expanded.

Another aspect of the invention provides computer usable medium including a program for visually indicating transfer of data in response to a pointing device data transfer command. The computer usable medium may include computer readable code for modifying a display position indicator on a display screen based on a data transfer command, and animating data transfer on the display screen based on the data transfer command from a pointing device. The data transfer command may be selected from a group consisting of cut, paste and copy. Modifying the display position indicator in response to one of a cut or copy command may include changing the position indicator to a position indicator with a reduced object in an indicator bubble. Animating the data transfer in response to one of a cut or copy command may include reducing a marked object to a reduced object and moving the reduced object through the position indicator into an indicator bubble. Animating the data transfer in response to one of a cut or copy command may include moving the marked object towards the position indicator while the object is being reduced. Modifying the position indicator in response to a paste command may include changing the position indicator to a position indicator without a reduced object in an indicator bubble. Animating data transfer in response to a paste command may include moving a reduced object from an indicator bubble in the position indicator through the position indicator, expanding the reduced object, and inserting the expanded object into a location indicated by a insertion marker. Animating data transfer in response to a paste command may include moving the expanding reduced object towards an insertion marker while the reduced object is expanded.

The foregoing and other features and advantages of the invention will become further apparent from the following detailed description of the presently preferred embodiments, read in conjunction with the accompanying drawing.

BRIEF DESCRIPTION OF THE DRAWINGS

FIG. 2 is a perspective view of one embodiment of an animation sequence in response to a copy data transfer command, in accordance with the present invention;

FIG. 3 is a perspective view of one embodiment of an animation sequence in response to a paste data transfer command, in accordance with the present invention.

DETAILED DESCRIPTION OF THE PRESENTLY PREFERRED EMBODIMENTS

Figure 1:
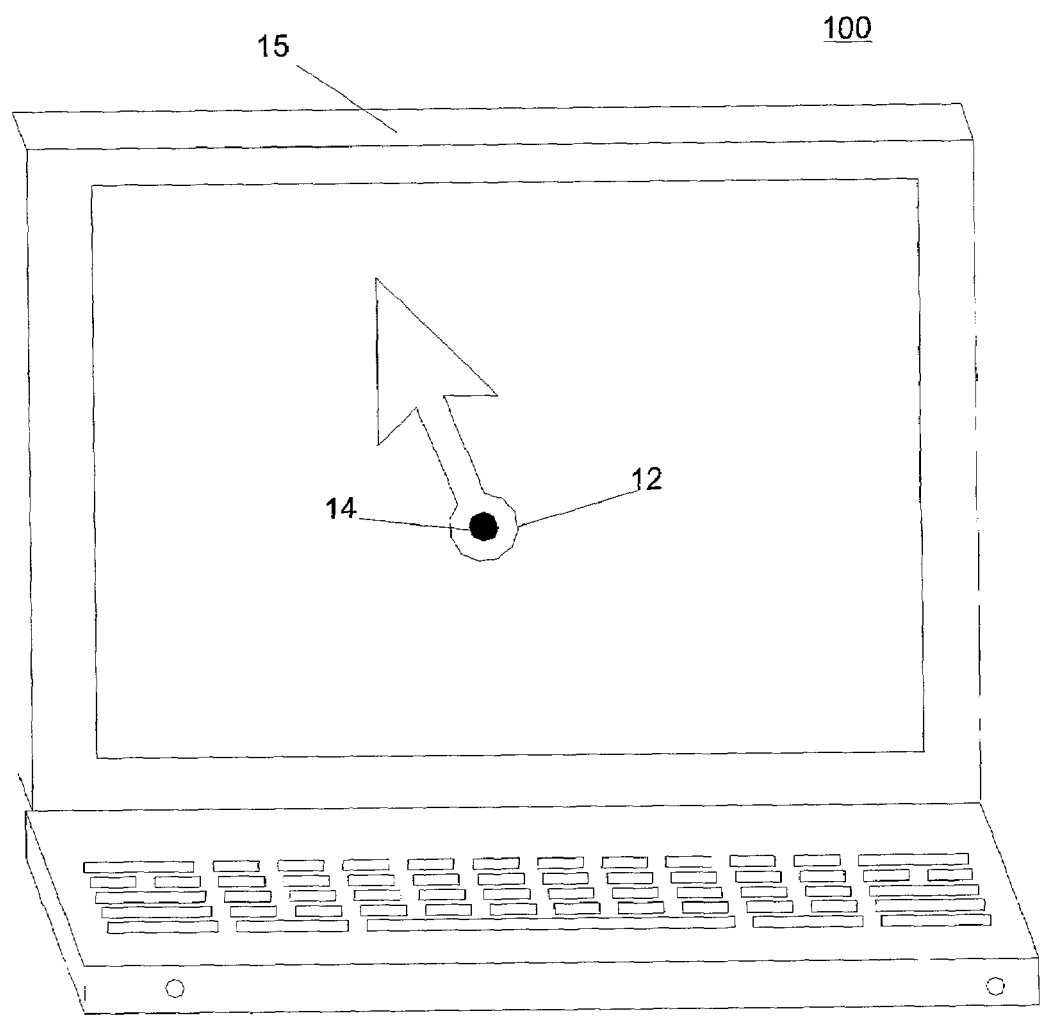
FIG. 1 is a perspective view of one embodiment of a pointing device position indicator for visually indicating data transfer, in accordance with the present invention.

One embodiment of a method of visually indicating transfer of data in response to a transfer data command is illustrated in FIG. 1 and designated in the aggregate as numeral 100. A pointing device display position indicator on a display screen of a computer 15 may be modified based on a data transfer command. The display position indicator 10 may include an indicating bubble 12. The indicating bubble 12 may be empty indicating that no data has been transferred into a temporary storage location. A reduced object 14 may be shown inside the indicating bubble 12 indicating data has been transferred into a temporary storage location. Referring to FIGS. 2 and 3. The data transfer may be animated on the display screen based on the data transfer command. The animation may include reducing a marked object 16 on a display screen and moving the object 18 as the object is being reduced into an indicating bubble 12 of a display position indicator 10. The animation may include expanding a reduced object 14 located in an indicating bubble 12 of a display position indicator 10 and moving the expanding object 58 towards an insertion marker 38.

In one embodiment, an object 16 on a display screen of a computer 15 may be marked using a pointing device. The object 16 may include text or graphics displayed on a computer screen. A copy command may be executed to transfer the marked object 16 into a temporary data storage location. When the copy command is executed, an animation sequence may show a copy of the marked object 18 being reduced as the copy 18 is moved into an indicator bubble 12 on the display position indicator 10.

One embodiment of a data transfer animation sequence of a copy data transfer command is shown in FIG. 2. Scene one 20 may show the marked object 16 and the display position indicator 10 at the time the copy command is executed. Scene two 22 may show a copy of the marked object 18 has reduced in size and moved closer to the display position indicator 10. In scene three 24, the copy of the marked object 18 may have reduced in size and moved closer to the display position indicator 10. In scene four, the copy of the marked object 18 may have further reduced in size and moved closer to the display position indicator 10. In scene five 28, the copy of the marked object 18 may have reduced in size and moved closer to the display position indicator 10. In scene six 30, the copy of the marked object 18 may be fully reduced and moved closer to the display position indicator 10. The fully reduced object 14 may be represented by; a dot on the display screen, a reduced image of the object, or any other representation of the marked object. In scene seven 32, the reduced object 14 may have moved into the display position indicator 10. In scene eight 34, the reduced object 14 may be shown passing through the display position indicator 10 toward the indicator bubble 12. Scene nine 36 may show the reduced object 14 populating the indicator bubble 12 of the display position indicator 10. Once the copy command has been executed, the reduced object 14 may remain in the indicator bubble 12 of the display position indicator 10. The reduced object 14 remaining in the indicator bubble 12 may provide a visual indication to the operator that an object is stored in the temporary storage location. Those skilled in the art will recognize that the number of animation scenes may vary.

Figure 4:
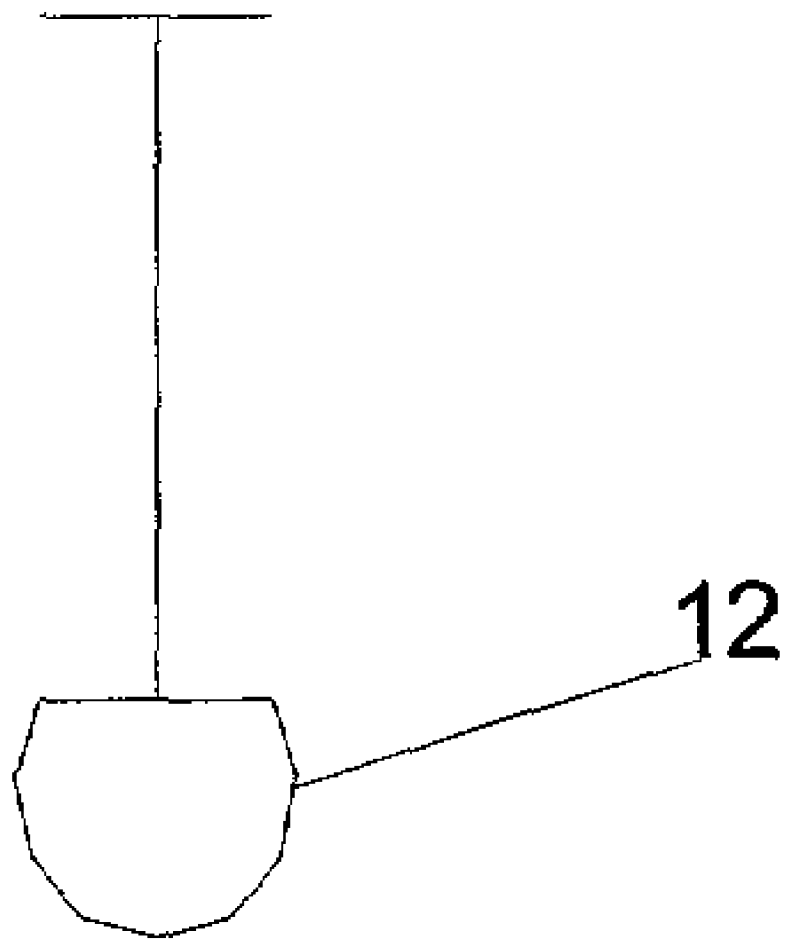
FIG. 4 is a perspective view of one embodiment of a pointing device position indicator for visually indicating data transfer, in accordance with the present invention.

Additionally, a cut command may result in similar animation on the display with the exception that the marked object 16 may be deleted in scenes two 22 through nine 36. Those skilled in the art will recognize that an indicating bubble may be added to a display position indicator of any shape. An example of attaching an indicator bubble 12 to an I-beam shaped display position indicator 10 is illustrated in FIG. 4.

In one embodiment, an insertion marker 38 may be positioned on a display screen where an object is to be inserted. A paste command may be executed to transfer an object stored in a temporary data storage location to the insertion marker location. When the paste command is executed, the reduced object 14 may be expanded as the object is moved toward the 38.

One embodiment of a data transfer animation sequence of a paste data transfer command is shown in FIG. 3. Scene one 40 may show an insertion marker 38 and a display position indicator 10 at the time a paste command is executed. The insertion marker 38 may be positioned were an object stored in a temporary storage location may be inserted. A reduced object 14 may populate an indicating bubble 12 of a display position indicator 10 indicating that there is an object stored in a temporary storage location. Scene two 42 may show the reduced object 14 passing through the display position indicator 10. In scene three 44, the reduced object 14 may be shown coming out of the display position indicator 10. In scene four, the reduced object 14 may be moved toward the insertion marker 38. In scene five 48, the reduced object 14 may start expanding as the reduced object 14 move towards the insertion marker 38. In scene six 50, the reduced object 14 may continue to expand as the object moves toward the insertion marker 38. In scene seven 52, the reduced object 14 may continue to expand as the object moves toward the insertion marker 38. In scene eight 54, the reduced object 14 may continue to expand as the object moves toward the insertion marker 38. Scene nine 56 may show the reduced object 14 fully expanded and inserted at the insertion marker 38 location. Once the paste command has been executed, the indicator bubble 12 of the pointing device position indicator 10 may remain empty. An empty indicator bubble 12 may provide the operator with a visual indication that the content of the temporary storage location has been inserted. Alternatively, a reduced object 14 may appear within the indicator bubble 12 after a paste command is executed. A reduced object 14 in the indicator bubble 12 may provide the operator with a visual indication that there is an object stored in the temporary storage location that may be inserted. Those skilled in the art will recognize that the number of animation scenes may vary. They will also recognize that an object stored in the temporary storage location may be inserted multiple times.

While the embodiments of the invention disclosed herein are presently considered to be preferred, various changes and modifications can be made without departing them the spirit and scope of the invention. The scope of the invention is indicated in the appended claims, and all changes that come within the meaning and range of equivalents are intended to be embraced therein.

The invention claimed is:

1. A method of visually indicating transfer of data in response to a pointing device data transfer command comprising:

modifying a display position indicator on a display screen based on a data transfer command;

animating data transfer on the display screen based on the data transfer command from a pointing device, wherein animating data transfer in response to one of a cut or copy command comprises reducing a marked object to a reduced object and moving the reduced object through the display position indicator into an indicator bubble, and moving the marked object towards the display position indicator while the object is being reduced.

* * * * *